United States Patent
DiCocco et al.

(10) Patent No.: US 8,191,833 B1
(45) Date of Patent: Jun. 5, 2012

(54) AIRCRAFT AND MISSILE AFTERBODY FLOW CONTROL DEVICE AND METHOD OF CONTROLLING FLOW

(75) Inventors: Jack DiCocco, Granger Township, OH (US); Troy Prince, Cleveland, OH (US); Mehul Patel, Streetsboro, OH (US); Tsun Ming Terry Ng, Sylvania, OH (US)

(73) Assignee: Orbital Research Inc., Cleveland, OH (US)

( * ) Notice: Subject to any disclaimer, the term of this patent is extended or adjusted under 35 U.S.C. 154(b) by 676 days.

(21) Appl. No.: 11/415,534

(22) Filed: May 2, 2006

Related U.S. Application Data (63) Continuation of application No. 10/750,422, filed on Dec. 30, 2003, now Pat. No. 7,070,144, which is a continuation-in-part of application No. 10/336,117, filed on Jan. 3, 2003, now Pat. No. 6,685,143.

(51) Int. Cl.
  *B64C 21/00* (2006.01)
(52) U.S. Cl. .................................................. 244/200.1
(58) Field of Classification Search .......... 244/198–209, 244/3.24, 130
  See application file for complete search history.

(56) References Cited

U.S. PATENT DOCUMENTS

| | | | |
|---|---|---|---|
| 2,986,999 A * | 6/1961 | Fiedler et al. ................. | 102/513 |
| 3,014,675 A | 12/1961 | Lewis | |
| 3,245,351 A * | 4/1966 | Crossett .......................... | 60/225 |
| 3,325,123 A * | 6/1967 | Null .............................. | 244/166 |
| 3,586,267 A * | 6/1971 | Ingelman-Sundberg ..... | 244/203 |
| 3,759,466 A * | 9/1973 | Evers-Euterneck ......... | 244/3.21 |
| 4,377,982 A | 3/1983 | Gongwer | |
| 4,741,498 A * | 5/1988 | Gerhardt ....................... | 244/130 |
| 4,917,333 A | 4/1990 | Murri | |
| 4,989,810 A * | 2/1991 | Meier et al. .................... | 244/208 |
| 5,125,596 A * | 6/1992 | Cavalleri ....................... | 244/3.22 |
| 5,209,438 A | 5/1993 | Wygnanski | |
| 5,335,886 A | 8/1994 | Greenhalgh | |
| 5,366,176 A | 11/1994 | Loewy et al. | |
| 5,445,346 A | 8/1995 | Gilbert | |
| 5,755,408 A | 5/1998 | Schmidt et al. | |
| 5,899,416 A * | 5/1999 | Meister et al. ................ | 244/207 |
| 5,938,404 A | 8/1999 | Domzalski et al. | |
| 6,105,904 A | 8/2000 | Lisy et al. | |

(Continued)

OTHER PUBLICATIONS

Mehul Patel, Richard Kolacinski, & Troy Prince; Flow Control Using Intelligent Control Modules for Virtual Aerodynamic Shaping; AIAA 2003-3663; 21st AIAA Applied Aerodynamics Conference Jun. 23-26, 2003, Orlando FL; pp. 1-15.

(Continued)

*Primary Examiner* — Tien Dinh
(74) *Attorney, Agent, or Firm* — Brian M. Kolkowski (57) ABSTRACT

The present invention relates to an afterbody flow control system and more particularly to aircraft or missile flow control system for enhanced maneuverability and stabilization. The present invention further relates to a method of operating the flow control system.

In one embodiment, the present invention includes a missile or aircraft comprising an afterbody and a forebody; at least one activatable flow effector on the missile or aircraft afterbody; at least one sensor each having a signal, the at least one sensor being positioned to detect forces or flow conditions on the missile or aircraft afterbody; and a closed loop control system; wherein the closed loop control system is used for activating and deactivating the at least one activatable flow effector based on at least in part the signal of the at least one sensor.

17 Claims, 5 Drawing Sheets

U.S. PATENT DOCUMENTS 6,431,494 B1 * 8/2002 Kinkead et al. ............. 244/76 B
6,751,530 B2 * 6/2004 Seifert et al. ...................... 701/4
6,796,532 B2 9/2004 Malmuth et al.
6,805,325 B1 10/2004 Malmuth et al.
6,837,465 B2 * 1/2005 Lisy et al. .................. 244/204.1

OTHER PUBLICATIONS

Mehul Patel, Jack DiCocco, & Troy Prince; Afterbody Flow Control for Low Alpha Missile Maneuvering; AIAA 2003-3673; 21st AIAA Applied Aerodynamics Conference Jun. 23-26, 2003, pp. 1-11.

Mehul Patel, Terry Ng, Alan Cain; A CFD Study of a Missile Aero Control Fin by Near-Wall Flow Modifications; AIAA 2003-0547; 41st Aerospace Sciences Meeting and Exhibit Jan. 6-9, 2003, Reno NV, pp. 1-11.

Mehul Patel, Terry Ng, Jack DiCocco, & Troy Prince; Flow Control Using Reconfigurable Porosity; AIAA 2003-3665; 21st AIAA Applied Aerodynamics Conference Jun. 23-26, 2003, pp. 1-11.

Mehul Patel, Terry Ng, Reed Carver, Jack DiCocco, & Troy Prince; Deployable Flow Effectors for Phantom Yaw Control of Missiles at High Alpha; 1st AIAA Flow Control Conference Jun. 24-26, 2002, St. Louis, MO; pp. 1-12.

J.E. Bernhardt and D.R. Williams; Closed Loop Control of Forebody Flow Asymmetry; Journal of Aircraft vol. 27, No. 3; May-Jun. 2000; pp. 491-498.

Lisa Barke, John Frate, and David Fisher; A Summary of the Forebody High-Angle-of-Attack Aerodynamics Research on the F-18 and the X-29A Aircraft; NASA Technical Memorandum, Nov. 1992; pp. 1-17.

David Fisher and Daniel Murri; Forebody Flow Visualization on the F-18A HARV with Actuated Forebody Strakes; NASA Technical Memorandum, Sep. 1998; pp. 1-10.

Lars Ericsson and Martin Breyers; Forebody Flow Control at Conditions of Naturally Occurring Separation Asymmetry; Journal of Aircraft, vol. 39, No. 2, Mar.-Apr. 2002; pp. 252-261.

L.E. Ericsson and J.P. Reding; Asymmetric Flow Separation and Vortex Shedding on Bodies of Revolution; From: Tactical Missile Aerodynamics; General Topics Edited by Michael J. Hemscb; vol. 141, Chapter No. 10; 1989; pp. 391-401.

* cited by examiner

AIRCRAFT AND MISSILE AFTERBODY FLOW CONTROL DEVICE AND METHOD OF CONTROLLING FLOW

CROSS REFERENCE TO RELATED APPLICATIONS

This application is a continuation of U.S. patent application Ser. No. 10/750,422 filed Dec. 30, 2003, now U.S. Pat. No. 7,070,144 which is a continuation in part of U.S. patent application Ser. No. 10/336,117 filed Jan. 3, 2003, which issued as U.S. Pat. No. 6,685,143.

The U.S. Government has a paid-up license in this invention and the right in limited circumstances to require the patent owner to license others on reasonable terms provided for by the terms of grant DAAE30-02-C-1052 awarded by the U.S. Army.

BACKGROUND OF THE INVENTION

1. Field of the Invention

The present invention relates to an aerodynamic flow control system and more particularly to aircraft or missile afterbody flow control system for enhanced maneuverability and stabilization at low angles of attack. The present invention further relates to a method of operating the flow control system.

2. Technical Background

Traditional aircraft and missile maneuvering technologies utilize conventional control surfaces such as tail-fins and canards to provide control and stability through all phases of an aircraft or missile's flight path. These control surfaces require a significant payload and volume to house the control actuation system for these conventional control surfaces, which includes heavy servomotors, thereby imposing significant limitations on the aircraft or missile aerodynamic performance. In addition, these hinged-control surfaces also reduce the effective payload, maximum achievable range, and lethality of missiles and aircraft.

Conventional missile and aircraft control techniques are not capable of meeting new multi-mission highly accurate, long-range fire requirements that are needed to ensure the multi-target engagement capabilities of missiles or aircraft, particularly "smart" missiles and aircraft. In addition, with missiles the overall cost of the control system per round needs to be minimum without affecting the aerodynamic efficiency of the missiles considering their subsistence period once deployed. The most popular choice of steering control for missiles or aircraft is afterbody or tail-based control due to its flexibility in modifying aerodynamic designs without affecting other surfaces (canards, wings, etc) as they fall out of its zone of influence. The major disadvantages of afterbody or tail-based control is space restriction, i.e., control surfaces must be located in an annular space around the throat of the propulsion nozzle; increased weight; and drag from exposed surfaces. The conventional control surfaces necessitate hinges, which increase the overall weight-induced aerodynamic drag, as well as the complexity of the propulsion system.

In view of the foregoing disadvantages of presently available control surfaces, it is desirable to develop a missile or aircraft aerodynamic afterbody control system flow control system that provides the necessary forces for missile or aircraft control with limited or no use of hinged control surfaces. It is further desirable to develop a missile or aircraft with an aerodynamic control system for maneuvering at low angles of attack. It is still further desirable to develop a missile or aircraft aerodynamic flow control system that is highly compact and lightweight with the ability of being deactivated when not required.

SUMMARY OF THE INVENTION

The present invention relates to an aerodynamic flow control system and more particularly to aircraft or missile with an afterbody flow control system for enhanced maneuverability and stabilization. The present invention further relates to a method of operating a missile or aircraft with such an aerodynamic flow control system.

In one embodiment, the present invention includes a missile or aircraft comprising an afterbody and a forebody; at least one activatable flow effector or active flow control device on the missile or aircraft afterbody; at least one sensor each having a signal, the at least one sensor being positioned to detect a force or flow separation on the missile or aircraft afterbody; and a closed loop control system; wherein the closed loop control system is used for activating and deactivating the at least one activatable flow effector or active flow control device based on at least in part the signal of the at least one sensor.

In another embodiment, the present invention includes a flow control system for a missile or aircraft afterbody comprising at least one activatable flow effector or active flow control devices; an inertial measurement unit having an output; and a closed loop control system; wherein the closed loop control system is used for activating and deactivating the at least one activatable flow effector or active flow control device based on at least in part the signal of the output of the inertial measurement unit.

In still another embodiment, the present invention includes a method of maneuvering a missile or aircraft afterbody comprising the steps of activating at least one activatable flow effector or active flow control device to create side forces on the missile or aircraft afterbody; estimating or determining side forces or flow separation on a missile or an aircraft afterbody based at least in part on a signal from at least one sensor, the at least one sensor being positioned to detect forces or flow separation on the missile or aircraft afterbody; and deactivating the at least one activatable flow effector or active flow control device in response to changed forces or a flow condition.

In still another embodiment, the present invention includes a missile or aircraft having a yawing moment comprising at least one activatable flow effector or active flow control device on the missile or aircraft boattail or tail fins wherein the at least one activatable flow effector or active flow control device is used to change the yawing moment of the missile or aircraft.

In still another embodiment, the present invention includes a missile or aircraft having a pitching moment comprising at least one activatable flow effector or active flow control device on the missile or aircraft boattail or tail fins wherein the at least one activatable flow effector or active flow control device is used to change the pitching moment of the missile or aircraft.

In still another embodiment, the present invention includes a missile or aircraft having a rolling moment comprising at least one activatable flow effector or active flow control device on the missile or aircraft boattail or tail fins wherein the at least one activatable flow effector or active flow control device is used to change the rolling moment of the missile or aircraft.

In still another embodiment, the present invention includes a missile or aircraft comprising a missile or aircraft having a boattail, the aircraft having drag and the boattail having at least one activatable flow effector or active flow control device wherein the at least one activatable flow effector or active flow control device is used to reduce the drag of the aircraft.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF THE DRAWINGS

FIG. 3. a) Perspective view of one embodiment of the afterbody section of a missile or aircraft having activatable flow effectors or active flow control devices, and sensors mounted therein; b) Sectional view of tail fin along plane A-A' shown in FIG. 3a).

DESCRIPTION OF THE PREFERRED EMBODIMENT

The present invention relates to an aerodynamic flow control system and more particularly to aircraft or missile with an afterbody flow control system for enhanced maneuverability and stabilization. The afterbody of the missile or aircraft for the present invention is defined as the back half of the length of the missile or aircraft, and more particularly as that section of fuselage behind the wings including but not limited to the tail section, i.e., the boattail and tail fins. The boattail is the rear portion of a missile or aircraft having decreasing cross-sectional area towards the rear. Preferably, the afterbody is the back 25% of the length of the missile or aircraft, and most preferably the afterbody is the tail section of the missile or aircraft.

The present invention most preferably relies on a successful marriage of the boattail geometry with the activatable flow effectors or active flow control devices incorporated within the geometry for aerodynamic control. The geometry of the boattail plays a critical part in how well the activatable flow effectors or active flow control devices perform. The onset of boattail and the taper angle is preferably optimized for the desired speed application so as the flow condition in the vicinity of the boattail is amenable to flow control devices. The boattail taper design, which depends on the flow conditions as well as fluid parameters such as the viscosity, density, temperature and pressure, is preferably optimized for the given application.

Additionally or alternatively, the same holds true for the tail-fin optimization as well. In other words, the present invention most preferably relies on a successful marriage of the tail-fin geometry with the flow control devices incorporated within the geometry for aerodynamic control. The geometry of the tail-fins plays a critical part in how well the flow control devices perform. The design of the tail-fin is preferably optimized for the desired speed application.

The activatable flow effector or active flow control devices of the present invention are electromechanical devices, which can be used to create disturbances in the flow over the surface of the missile or aircraft. Preferably, the activatable flow effector or active flow control devices, which induce small disturbances or perturbances in the vicinity or close proximity to the activatable flow effector or active flow control device. Further preferably, the activatable flow effector or active flow control device is flush or nearly flush, when deactivated, with the surface of the missile or aircraft to which it has been installed thereby creating little or no drag on the missile or aircraft. Still further preferably, the activatable flow effector or active flow control devices have no hinged parts or surfaces. The activatable flow effector or active flow control devices of the present invention include but are not limited to active vortex generators, which are deployable including but not limited to flow deflectors, balloons, microbubbles, and dimples or create active pressure active regions by suction or air pressure; synthetic jets including zero-net-mass synthetic jets; pulsed vortex generators; directed jets; vortex generating devices (fluidic and mechanical) plasma actuators including weakly ionized plasma actuators; wall turbulators; porosity including but not limited to reconfigurable, inactive and active; microactuators; and thermal actuators. The present invention further relates to a method of operating the flow control system.

For stabilization and maneuverability of the missile or aircraft afterbody, the flow control system relies on the effectiveness of the activatable flow effector or active flow control devices in generating on-demand forces or flow conditions at different regions around the missile or aircraft afterbody to create the desired flow effect including but not limited to stabilization or maneuverability of the aircraft or missile. Flow condition may be defined as a mode or a state of a fluid with a characteristic behavior. These states may be defined by physical factors such as: density, velocity, temperature, viscosity and pressure. Flow conditions can be of several types. Flows may be steady (not time-varying) or unsteady (time-varying), one-dimensional, two-dimensional or three-dimensional. These conditions are different for compressible and incompressible flows. Other conditions include but are not limited to, laminar, transitional, turbulent, attached, reattached, and shear flow.

The flow control system for the missile or aircraft afterbody can be used at both low and high angles of attack. The activatable flow effector or active flow control devices of the present invention are active micro-vortex generators that effectively control the pressure distribution along the afterbody of the missile or aircraft, yielding forces and yawing, rolling and pitching moments for controlling of yaw, roll or pitch on the missile or aircraft body. The activatable flow effector or active flow control devices of the present invention preferably are deployable flow effectors or other types of micro-vortex generators. Activatable flow effectors or active flow control devices of the present invention are flow effectors that are activated to generate fluid flow disturbances in the vicinity of the flow effector, and that can be deactivated when not needed. Preferably, the activatable flow effector or active flow control devices of the present invention can be operated at high frequencies. Further preferably, the activatable flow effector or active flow control devices are capable of being cycled at frequencies of at least about 1 Hz, more preferably at frequencies of at least about 20 Hz, even more preferably at frequencies of at least about 60 Hz, even more preferably at frequencies of at least about 100 Hz, and most preferably at frequencies of at least about 250 Hz. One type of active flow control device or activatable flow effector is a deployable flow effectors, which is described in more detail in the various embodiments in the Figures below. The frequencies at which the active flow control device or activatable flow effector of the present invention are cycled may be determined based in part on a number of factors including but not limited to the desired flow effect, autopilot frequency response characteristics, missile or aircraft dynamics, and missile or aircraft environmental conditions.

Some of the other types of activatable flow effectors or active flow control devices not shown in the Figures (but described in more detail in U.S. Pat. No. 6,302,360 B1 to Ng which is herein incorporated by reference) include but are not limited to spaced apart valves that are positioned at inlets of a vacuum or pressure chamber, or are connected by pneumatics to a vacuum or pressure source. Preferably, the valves contain a flap that operates to open and close the valves as directed by electrostatic forces. Other valve configurations can also be used. When the valves are opened, the negative pressure from the vacuum chamber or source causes withdrawal of air from the surface of the missile or aircraft forebody through the surface orifices. Therefore, it can be seen that the opening of the valves causes the pressure active region to generate a net inflow of air, resulting in the generation of vortices, that can be used to control the airflow around the afterbody surface of the missile or aircraft for desired control effect such as improved maneuverability and/or stability. Similarly, when the valves are open to a positive pressure chamber or source, a net outflow of air is generated resulting in the generation of vortices, which also act beneficially to reattach the air flow to the afterbody surface of the missile or aircraft. For purposes of this invention activatable flow effectors or active flow control devices include any type of device or article known to those skilled in the art or discovered at a later point that is used to assist in the reattachment of airflow to a missile or aircrafts surface. Preferably, the activatable flow effectors or active flow control devices of the present invention are deployable flow effectors. Further preferably, the missile or aircraft of the present invention has at least about 4 activatable flow effector or active flow control devices, more preferably at least about 6 activatable flow effector or active flow control devices, even more preferably at least about 8 activatable flow effector or active flow control devices, still even more preferably at least about 50, and most preferably at least about 200. The applicants further incorporate by reference U.S. patent application Ser. Nos. 10/336,114, and 10/336,113.

Figure 1:
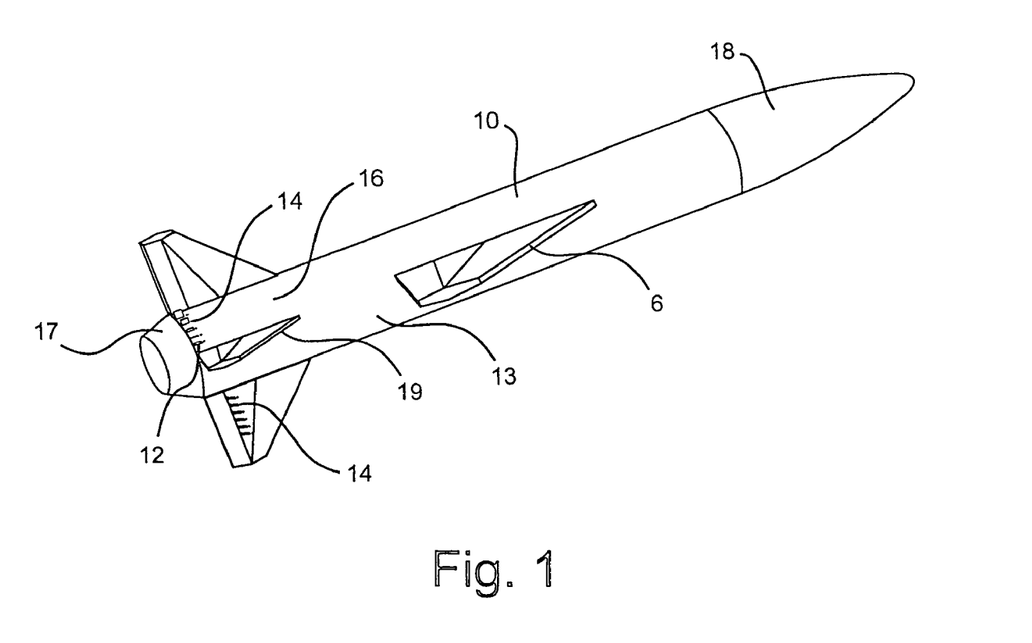
FIG. 1. Schematic view of one embodiment of a missile having a forebody and afterbody with activatable flow effectors or active flow control devices, and sensors mounted on the tail fins and boattail.

Referring now to FIG. 1, there is shown a schematic view of one embodiment of a missile 10 having a forebody 18 and an afterbody 13. The afterbody 13 having at least one activatable flow effector or active flow control device 12. The afterbody further having at least one sensor 14. The sensor being positioned to detect flow separation from the flow surface 16 on the missile 10 afterbody 13. In this embodiment, activatable flow effector or active flow control devices 12 as well as sensors 14 are incorporated into the boattail 17 and tail fins 19 of the missile. The afterbody 13 of this specific embodiment having a number of flow effectors 12 and sensors 14 mounted in the afterbody 13 (or tail section) therein. Furthermore in this specific embodiment, the individual flow effectors 12 and individual sensors 14 are in close proximity with respect to each other. The fluid boundary layer is a thin layer of viscous flow exhibiting certain pressure variation characteristics and fluid dynamics that affect the operation of the flow surface 16. The fluid is generally air. The flow surface 16 for purposes of the present invention is the afterbody of a missile or an aircraft.

Figure 2:
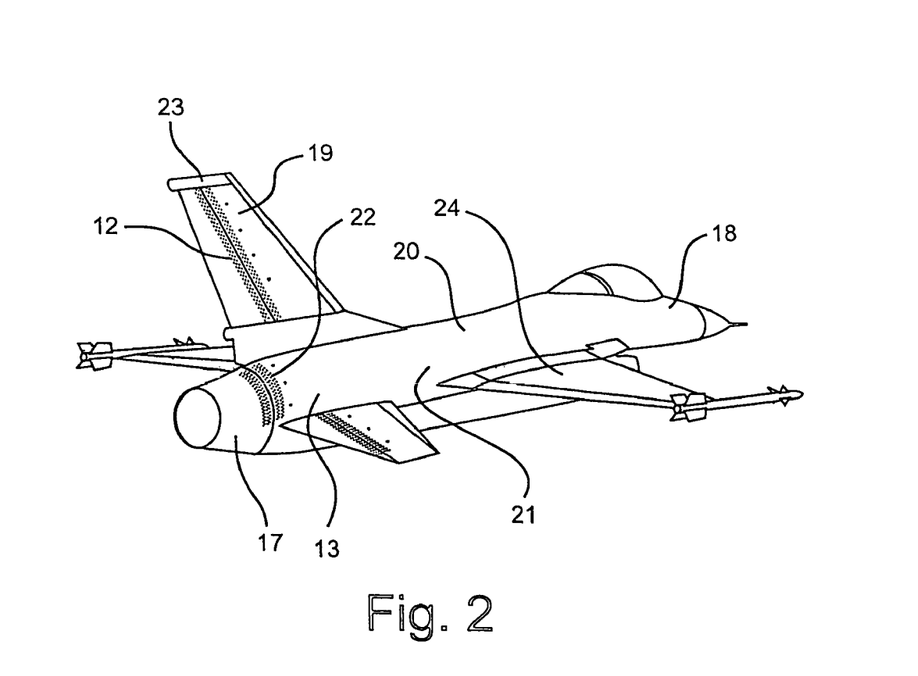
FIG. 2. Schematic view of one embodiment of an aircraft having a forebody and afterbody with activatable flow effectors or active flow control devices, and sensors mounted on the tail fins and boattail.

FIG. 2 is a schematic view of one embodiment of an aircraft 20 adapted with the vortex generating system 22 of the present invention. The airplane can be any type of aircraft, including commercial, military and space vehicles. The aircraft 20 includes a fuselage 21, a tail 23, wings 24, forebody (nose) 18, and afterbody 13. In this specific embodiment, the individual activatable flow effectors or active flow control devices 12 and individual sensors 14 are also mounted in close proximity with respect to each other on the afterbody 13 of the aircraft 20 including on the aircraft's 20 tail fins 19 and boattail 17.

The sensor(s) of the present invention include but are not limited to a dynamic pressure sensor, shear stress sensor (hot film anemometer, a direct measurement floating-element shear stress sensor), inertial measurement unit or system, and other sensors known to those skilled in the art whose signal could be used to estimate or determine flow condition such as separation on the surface of the missile or aircraft, which would function as a trigger point for actuating the activatable flow effectors or active flow control devices. The sensors of the present invention are used to determine or estimate flow separation. An inertial measurement unit for example is a sensor, which would not directly measure forces or flow separation, but could be used to estimate or predict separation. The preferred sensor of the present invention is a pressure sensor. The pressure sensor is used to predictor sense flow separation. The pressure sensor can be any type of sensor suitable for measuring the pressure at the flow surface. The pressure sensor can for example be a piezoelectric device, which generates an electric signal in response to a sensed pressure, a shape memory alloy device, or any other pressure sensor or transducer known to those skilled in the art. Preferably, the ratio of flow effectors to sensors is less than about 100:1, more preferably less than or equal to about 50:1, still preferably less than or equal to about 20:1, even more preferably less than or equal to about 3:1, still even more preferably less than or equal to about 2:1, and most preferably less than or equal to 1:1. The higher the concentration of pressure sensors to flow effectors the more redundancy can be built into the system utilizing the present invention. Most preferably the sensor is a flush, surface mounted diaphragm type pressure sensor. The at least one sensor 14 having a signal which is used at least in part by a controller (not shown) to activate and deactivate the at least one activatable flow effector or active flow control device 12.

In addition to pressure sensors, various embodiments of the present invention may also include a means for determining the relative spatial orientation of the flow effectors and/or sensors with respect the flow separation on the missile or aircraft body. This means would include utilizing the output of an inertial measurement unit and other systems, which could be used to determine the missile or aircraft orientation. An inertial measurement unit provides six-degree-of-freedom motion sensing for applications such as navigation and control systems. Angular rate and acceleration are measured about three orthogonal axes.

Figure 3:
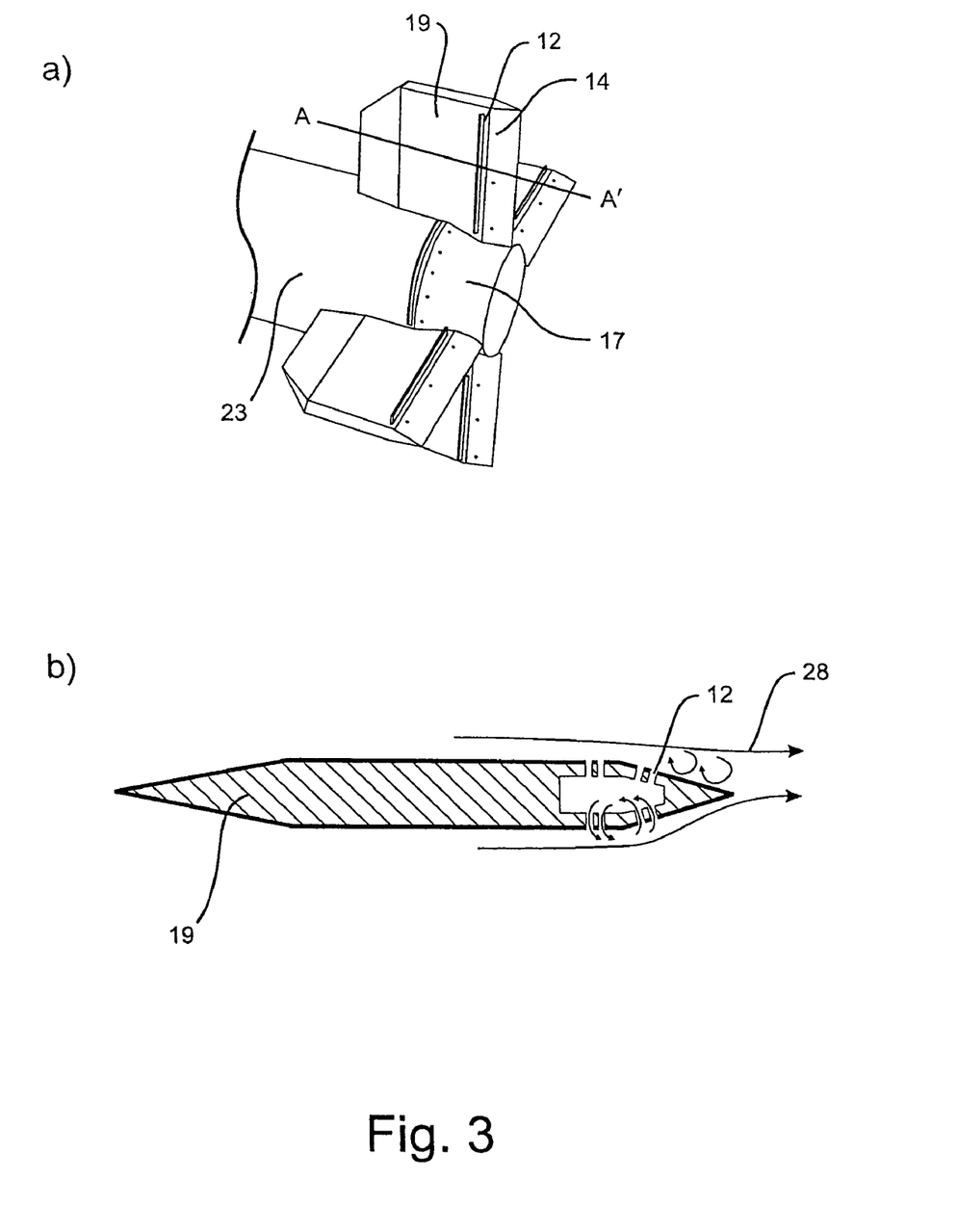

FIG. 3a) is a perspective view of one embodiment of the afterbody section and more particularly the tail section 23 of a missile or aircraft having an activatable flow effector or active flow control device 12 and sensors 14 mounted therein. The missile or aircraft afterbody of the present invention can be designed with activatable flow effector or active flow control devices 12 and sensors 14 mounted in the tail fins 19 and/or the boattail 17 to provide for improved stability, maneuverability, or controllability with the present flow control system. This flow control system is designed to provide for a variety of moments about the aircraft, which allow for both flow separation and flow attachment and result in improved stability and maneuverability. These moments can be used to change the drag, the yaw, the lift, the roll, the pitch and the thrust of the missile or aircraft. FIG. 3b) is a sectional view of section A-A' of a missile or aircraft tail fin 19 as shown in FIG. 3a). FIG. 3b) shows the fluid flow 28 around a missile or aircraft tail fin 19 at a section A-A' in the proximity of the activatable flow effector or active flow control devices 12, and the various embodiments of the resultant flow separation and re-attachment with activation and deactivation of the activatable flow effector or active flow control device 12 of the present invention.

Figure 4:
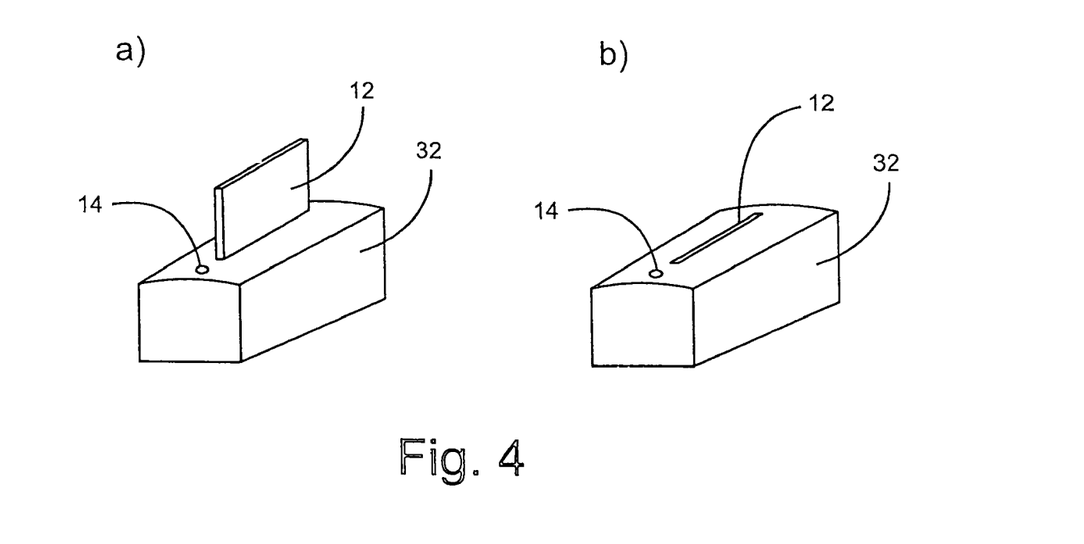
FIG. 4. Perspective view of one embodiment of a module containing a co-located sensor, and a) a deployable flow effector (deployed) and b) a deployable flow effector (retracted).

In FIG. 4, there is shown a perspective view of one embodiment of a module containing a co-located sensor, and a) an activatable, deployable flow effector (deployed) and b) an activatable, deployable flow effector (retracted). In this particular embodiment, the module 32 contains an activatable, deployable flow effector 12 and a pressure sensor 14. The activatable, deployable flow effector 12 being capable of being deployed into and retracted from, respectively, the fluid boundary layer flowing over the flow surface of the missile or aircraft forebody wherein the module 32 is employed. The deploying and retracting can be accomplished using any device such as pneumatic pressure, hydraulic pressure, vacuum, a mechanical device such as a solenoid valve, a microelectromechanical device, any combination thereof or the like. The module 32 may or may not include a controller (not shown) internal to the module. The pressure sensor 14 is connected to the controller (not shown). If the controller (not shown) is not internal to the module 32 then the module 32 preferably further comprises a link between pressure sensor 14 and the controller, and another link between the controller (not shown) and deploying means (not shown). The controller (not shown) is programmed to operate the deploying and refracting means in response to specific pressure conditions sensed at the flow surface (not shown). The controller (not shown) can be any device such as a computer, suitable for gathering information from the pressure sensors 14, and directing the activation of the activatable flow effector or active flow control devices 12. Where a number of activatable flow effectors or active flow control devices 12 and/or pressure sensors 14 (or modules 32) are employed, the controller (or controllers) (not shown) can be programmed and connected to integrate each of the activatable flow effectors or active flow control devices 12, pressure sensors 14 and modules 32 so that the output from all of the regions will be coordinated to enhance and possibly optimize the stabilization and maneuverability of a missile or an aircraft forebody. Specific patterns of deployment and/or retraction of the flow effectors 12 can be determined to handle a variety of routine events and also incorporated into the control scheme.

Figure 5:
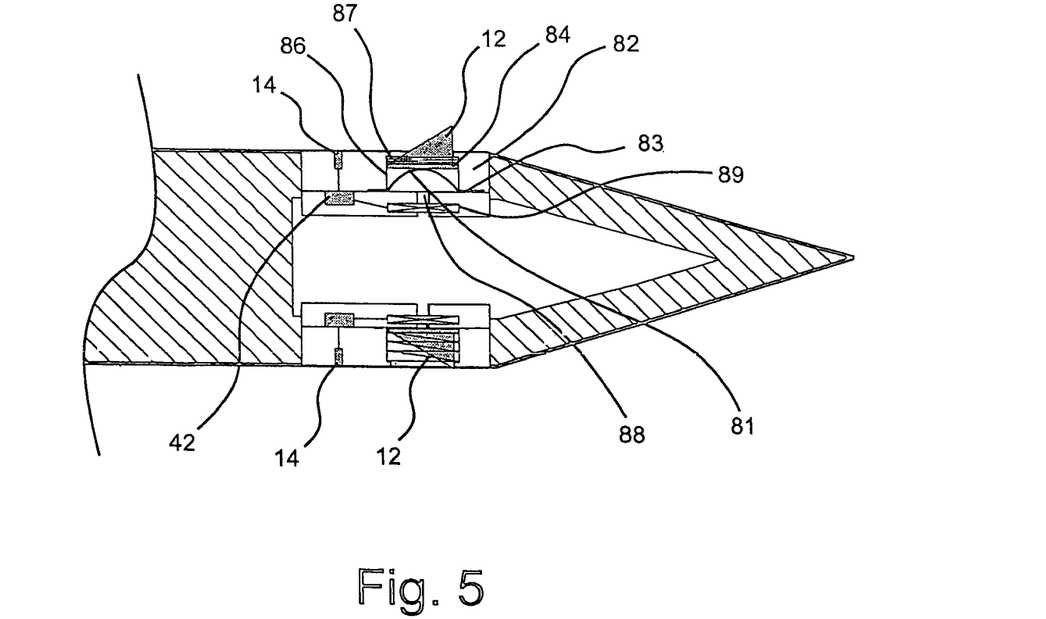
FIG. 5. Sectional view of one embodiment of the afterbody section of a missile or aircraft a) fin and b) boattail.

FIG. 5 is a sectional view of one embodiment of the afterbody section (tail section) of a missile or aircraft having an activatable flow effector or active flow control device 12 and sensor 14 mounted therein. In FIG. 5, the two activatable flow effectors or active flow control devices 12 shown in this cross-section are movably attached by an attachment means, i.e., a hinge 91, to a base structure 82. The activatable flow effectors or active flow control devices 12 are deployable flow effectors. The activatable flow effectors or active flow control devices 12 are further movably attached to a piston 84. The piston 84 moves within a cylinder 86 in response to a pressure source (not shown) applied via a pneumatic system 89 against an elastomeric sheet 81 to move the pistons 84 and in return to deploy and retract the flow effectors 12. The piston 84 also is connected to a biasing means 87, i.e., a spring, to return the piston 84 to its original position upon removing the pressure source, and therefore retracting these deployable flow effectors 12. In this particular embodiment, the pressure is applied to the piston 84 via a pressure inlet/outlet 88. Also shown in this particular embodiment are seals in the form of O-rings 83 to seal the pneumatic system (not shown) of the pressure source (not shown); and two sensors 14. The sensors 14 are connected via leads to a controller (not shown). The pressure source (not shown) is also connected to the controller (not shown).

Figure 6:
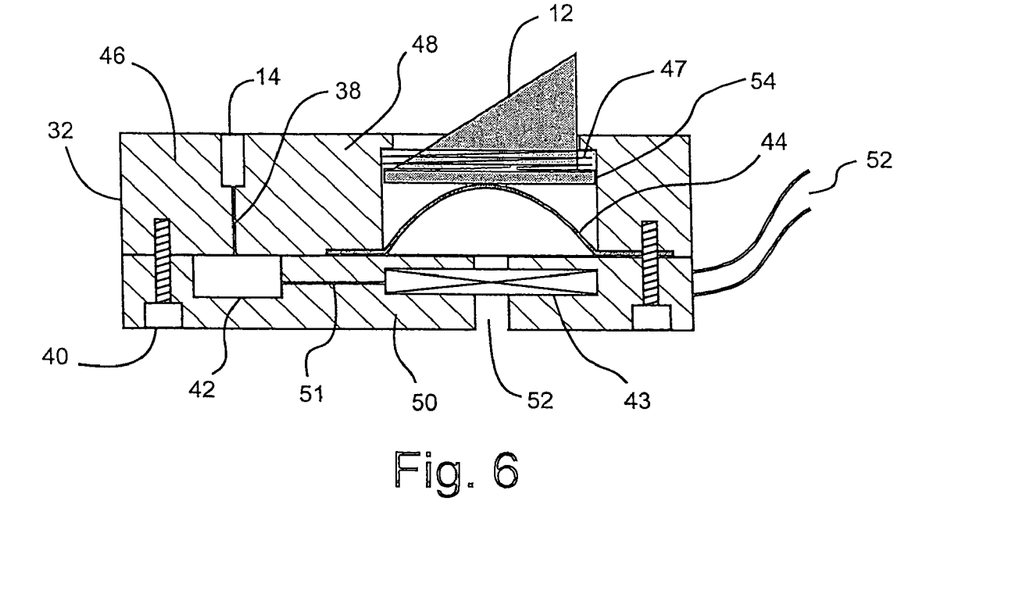
FIG. 6. Sectional view of one embodiment of a deployable flow effector.

FIG. 6 is a sectional, detailed view of a module 32 (as shown in FIG. 4) with an activatable deployed flow effector 12. In FIG. 6, the activatable deployed flow effector 12 is movably attached to the upper portion 48 of the housing 46 of the module 32 and is attached to the lower portion 50 of the housing 46 of the module 32 by at least two fasteners 40. The upper portion 48 of the housing 46 mates with the lower portion 50 with a sealing ring (not shown) and a sealable, flexible element 44 there between. The flow effector 12 is deployed by pressure being applied to the flexible element 44. The flow effector 12 has a biasing means (a spring) 42 which attaches at one end to the upper portion 48 of the housing 46 and at the other end to the base 54 of flow effector 12. Directly beneath the flow effector 12 is a valve 43, which opens and closes to allow for the application of fluid or gas pressure from a pressure source not shown to be applied to the flexible element 44 through a pneumatic pathway 52. A pressure sensor 14 senses fluid flow at or near the surface over which the fluid is flowing. Preferably the pressure sensor at the surface of the airfoil, and most preferably it is flush with such surface. The pressure sensor 14 can be any pressure sensor but advantageously is a microelectromechanical (MEMS) based or piezoelectric based sensor. MEMS devices are small mechanical/electrical systems that perform small-scale tasks that provide large-scale effects. MEMS devices are generally manufactured using batch microfabrication technology, the same manufacturing technology used to make integrated circuits (IC's). Consequently, many of the same benefits of IC manufacturing are applicable to MEMS manufacturing including high reliability, high yield, and low cost. Furthermore, since IC's and MEMS are both silicon-based technologies and are fabricated using similar techniques, it is relatively easy to merge microelectronics and micromechanical elements onto the same substrates. Electrostatic actuated MEMS devices have two dominating advantages as compared to other actuation mechanisms, which are high bandwidth and low power consumption. The sensor transmits a signal, in this case a voltage but it is understood to one skilled in the art that the signal can be other than voltage, including, but not limited to, current, pressure, hydraulic or optical. The signal corresponds to the pressure it senses.

The pressure sensors 14 (or other sensors) are connected to a controller 42 internal to the module 12 (or optionally external to the module). The controller 42 can be for example a proportional-integral-derivative (PID) controller, an adaptive predictive controller, or an adaptive predictive feedback controller. The controller of the present invention is preferably a closed loop control system. The controller can be used to minimize side forces or to create commanded side forces on the missile or aircraft forebody. The pressure sensor transmits a signal to the controller 42 through the electrical connection 38 (in practical application, multiple pressure sensors 14 send multiple signals to the controller 42). The controller 42 processes the signals to determine, through mathematical modeling, the dynamics of the flow surface. Such dynamics include boundary layer separation and stall. It is the predictive ability of the controller 42, which provides for this function and expands this system from being merely responsive. This is especially advantageous for dynamic systems, which are nonlinear and time varying and operating in challenging environments. The controller 42 produces an output signal to a monitor, recorder, alarm and/or any peripheral device for alarming, monitoring, or in some manner, affecting or precluding the dynamics upon its incipience. Advantageously, the controller 42 is the ORICA™ controller, an extended horizon, adaptive, predictive controller, produced by Orbital Research, Inc. and patented under U.S. Pat. No. 5,424,942, which is incorporated herein by reference. Under certain conditions, the controller 42 (or optionally an external controller) which is connected via electrical connection 46 to the valve 43 causes the valve 43 to open thereby resulting in the deployment of the flow effector(s) 12.

The closed loop control system of the present invention not only receives input in part from the sensors, but also can be set up to receive input from a number of other sources. These sources can include but are not limited to the autopilot, crash avoidance, or steering systems on an aircraft; or similar systems or non-integral, non-internal command control systems used to re-program a missile in flight. The missile or aircraft can be maneuvered or stabilized using the flow control system based in part on the sensors input and in part (if necessary) on new input from for example the autopilot into the closed loop control system to activate or deactivate the flow effectors as required.

Preferably, the pressure source (or other deployment and/or retraction means) is internal to the module 12. The sealable, flexible element 44 referred to above can be made of a single polymer or a combination of polymers. The pressure source can be air bled from an aircraft turbine engine, a pressurized gas cartridge, or pressurized fluid. The biasing means is employed to urge the sealable, flexible element 44 towards its quiescent state after pressure is removed or reduced. The biasing means can be any device or spring like means, such as vacuum or pressure, mechanical or electro-mechanical device.

Figure 7:
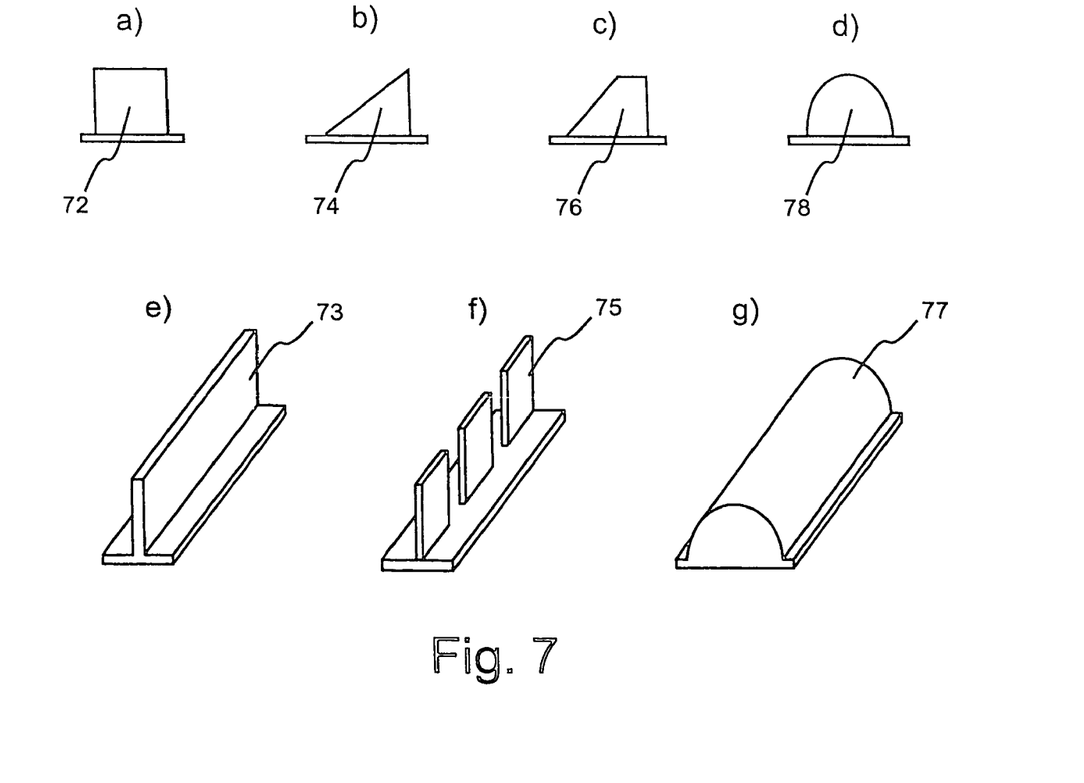
FIG. 7. Sectional view of deployable flow effector shapes.

The deployable portion of the activatable, deployable flow effectors shown in the previous Figures are small mechanical tabs preferably made from epoxy glass-fabric, and deactivate to assume a position underneath the skin surface of the missile or aircraft in their retracted state. Several examples of various embodiments of the flow effectors are shown in FIG. 7. *a, b, c, d, e, f,* and *g*. These cross-sectional views demonstrate that rectangular 72, triangular 74, irregular 76, semi-circular 78, a fence 73, a separated (or picket) fence 75 and a half-cylinder 77. The present invention is, however, not limited to these shapes and it is envisioned that any shape of activatable, deployable flow effector known presently or conceived of in the future by those skilled in the art may be used. Other types of deployable flow effectors which can be used these include but are not limited to bumps, dimples, and tubes. Upon controlled activation, the activatable flow effectors or active flow control devices (deployable or other) manipulate the forebody of the missile or aircraft's vortical flow field to generate the desired forces or flow separation. Single flow effectors or combinations of flow effectors can be activated either statically or cycled at a varying frequency (oscillated) to obtain a desired side force or yawing moment. Varying frequency or oscillation of the flow effectors includes but is not limited to pulse width modulation or other techniques known to those skilled in the art.

Figure 8:
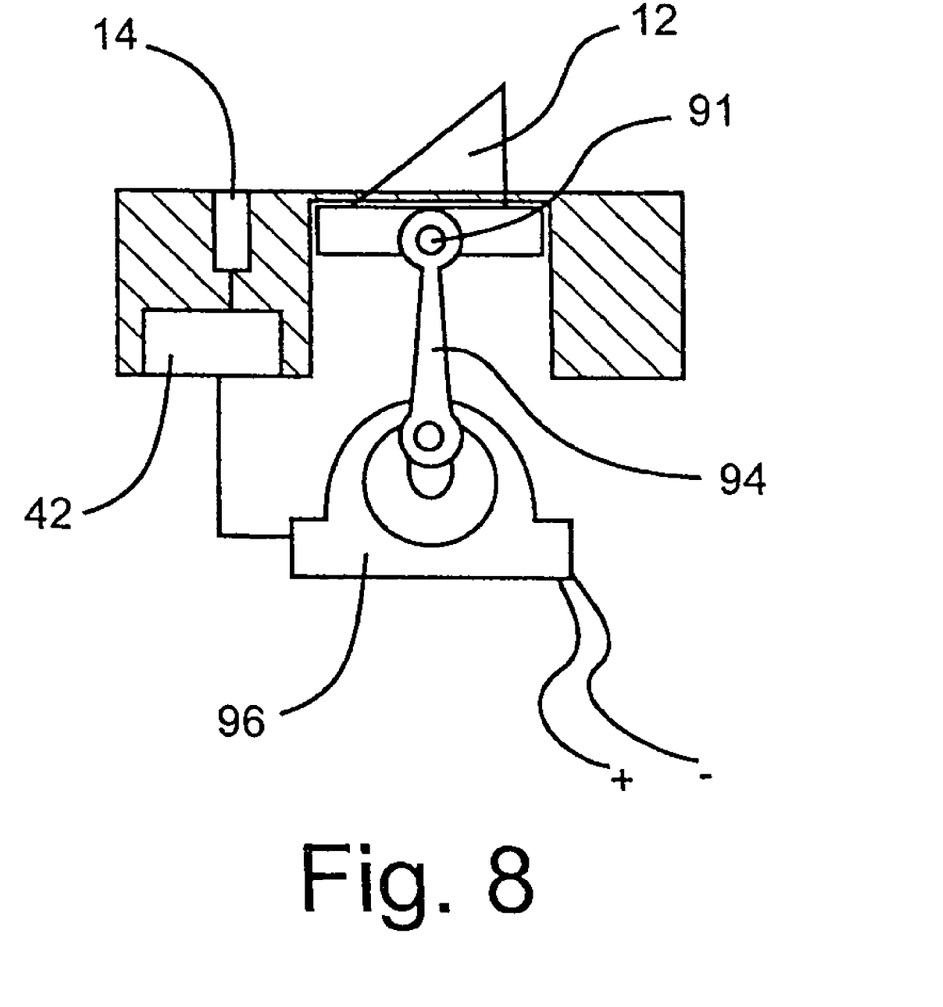
FIG. 8. Sectional view of another embodiment of a deployable flow effector.

FIG. 8 is a sectional view of another embodiment of an activatable, deployable flow effector. In FIG. 7, the activatable flow effector or active flow control device 12 is a deployable flow effector. The activatable, deployable flow effector 12 is further movably attached to a camshaft 94. The camshaft 94 moves in response to an electric motor 96 to deploy and retract the flow effector 12. The motor is connected to a controller 42. The controller 42 activates and deactivates the deployable flow effector in response to at least in part the signal from the sensor 14.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A missile or aircraft comprising
   a missile or aircraft having an afterbody and forebody,
   the missile or aircraft afterbody having a boattail and tail fins, the missile or aircraft having drag, and
   the boattail or tail fins having at least one activatable flow effector or active flow control device
   wherein the at least one activatable flow effector or active flow control device is used to reduce the drag of the aircraft or missile.

2. The missile or aircraft in claim 1, further comprising at least one sensor having an electrical signal, the at least one sensor being positioned to measure a force or flow condition on the missile or aircraft's afterbody.

3. The missile or aircraft in claim 2, further comprising a closed loop control system wherein the closed loop control system may be used for activating and deactivating the at least one activatable flow effector based on at least in part the electrical signal of the at least one sensor.

4. The missile or aircraft in claim 1, wherein the at least one activatable flow effector or active flow control device is a synthetic jet.

5. The missile or aircraft in claim 1, wherein the at least one activatable flow effector or active flow control device is a plasma actuator.

6. The missile or aircraft in claim 1, wherein the at least one activatable flow effector or active flow control device is a balloon.

7. A missile or aircraft having a moment comprising
   a missile or aircraft having an afterbody and forebody,
   the missile or aircraft afterbody having a boattail and tail fins,
   at least one activatable flow effector or active flow control device on the missile or aircraft boattail or tail fins wherein the at least one activatable flow effector or active flow control device is used to change a moment of the missile or aircraft, the moment being a pitching or yawing moment.

8. The missile or aircraft having a moment in claim 7, wherein the at least one activatable flow effector or active flow control device operates at frequencies of at least about 20 Hz.

9. The missile or aircraft having a moment in claim 7, further comprising at least one sensor having an electrical signal, the at least one sensor being positioned to measure a force or flow condition on the missile or aircraft's afterbody.

10. The missile or aircraft having a moment in claim 9, further comprising a closed loop control system wherein the closed loop control system may be used for activating and deactivating the at least one activatable flow effector based on at least in part the electrical signal of the at least one sensor.

11. The missile or aircraft having a moment in claim 10, wherein the controller is a proportional-integral-derivative (PID) controller.

12. The missile or aircraft having a moment in claim 10, wherein the controller is an adaptive predictive controller.

13. The missile or aircraft having a moment in claim 7, wherein the at least one activatable flow effector or active flow control device is a synthetic jet.

14. The missile or aircraft having a moment in claim 7, wherein the at least one activatable flow effector or active flow control device is a plasma actuator.

15. A missile or aircraft comprising
a missile or aircraft having an afterbody and forebody, and
the afterbody of the missile or aircraft having at least one plasma actuator
wherein the at least one plasma actuator is used to maneuver the missile or aircraft by changing a rolling moment.

16. A missile or aircraft comprising
a missile or aircraft having an afterbody and forebody,
at least one sensor having an electrical signal, the at least one sensor being positioned to a force or flow condition on the missile or aircraft's afterbody, and
the afterbody of the missile or aircraft having at least one plasma actuator
wherein the at least one plasma actuator is used to maneuver the aircraft.

17. The missile or aircraft having a moment in claim 16, further comprising a closed loop control system wherein the closed loop control system may be used for activating and deactivating the at least one plasma actuator based on at least in part the electrical signal of the at least one sensor.

* * * * *